United States Patent [19]

Hosoya et al.

[11] Patent Number: 4,568,955

[45] Date of Patent: Feb. 4, 1986

[54] RECORDING APPARATUS USING A TONER-FOG GENERATED BY ELECTRIC FIELDS APPLIED TO ELECTRODES ON THE SURFACE OF THE DEVELOPER CARRIER

[75] Inventors: Masahiro Hosoya, Yokohama; Tsutomu Uehara, Yokosuka; Takefumi Nosaki, Yokohama, all of Japan

[73] Assignee: Tokyo Shibaura Denki Kabushiki Kaisha, Kawasaki, Japan

[21] Appl. No.: 594,011

[22] Filed: Mar. 27, 1984

[30] Foreign Application Priority Data

Mar. 31, 1983 [JP] Japan .................................. 58-56020
Mar. 31, 1983 [JP] Japan .................................. 58-56035

[51] Int. Cl.[4] .............................................. G01D 15/06

[52] U.S. Cl. .................................. 346/153.1; 346/159; 355/3 DD

[58] Field of Search .............................. 346/153.1, 159; 355/3 DD; 118/654

[56] References Cited

U.S. PATENT DOCUMENTS 4,491,855 1/1985 Fujii et al. .......................... 346/159

FOREIGN PATENT DOCUMENTS 126144 4/1975 Japan .
66969 9/1981 Japan .
178279 11/1982 Japan .

*Primary Examiner*—Thomas H. Tarcza
*Attorney, Agent, or Firm*—Cushman, Darby & Cushman

[57] ABSTRACT

In a recording apparatus of the present invention, a visible image based on image information is formed on an ordinary sheet by a developer. The recording apparatus comprises a developing roller spaced at a predetermined distance from and facing the ordinary sheet and carrying the developer thereon, a recording electrode and a signal source connected thereto, for propelling the developer on the developing roller to the ordinary sheet by generating an electric field between the ordinary sheet and the developing roller according to the image information, a plurality of mutually insulated electrodes provided on the developing roller and extending therefrom in one direction, an A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller.

10 Claims, 14 Drawing Figures

FIG. 3
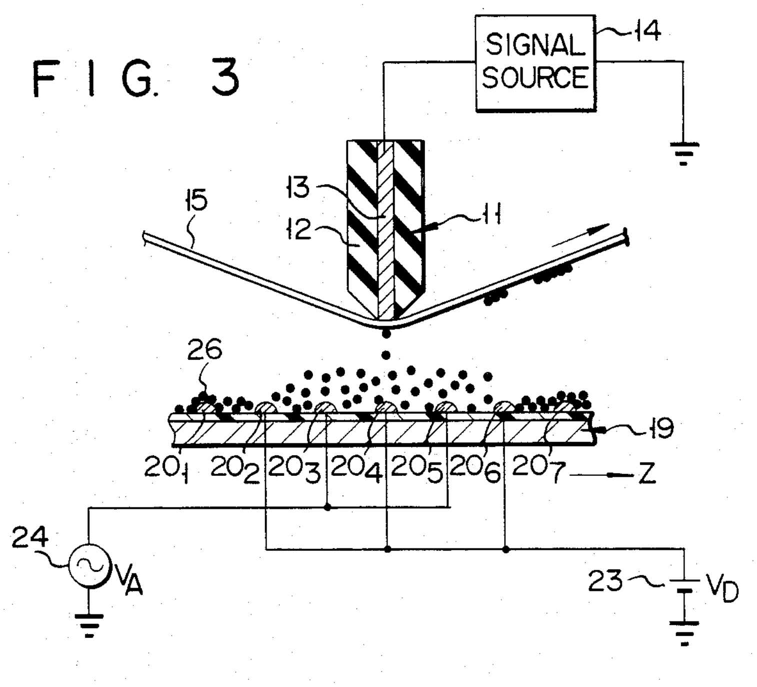
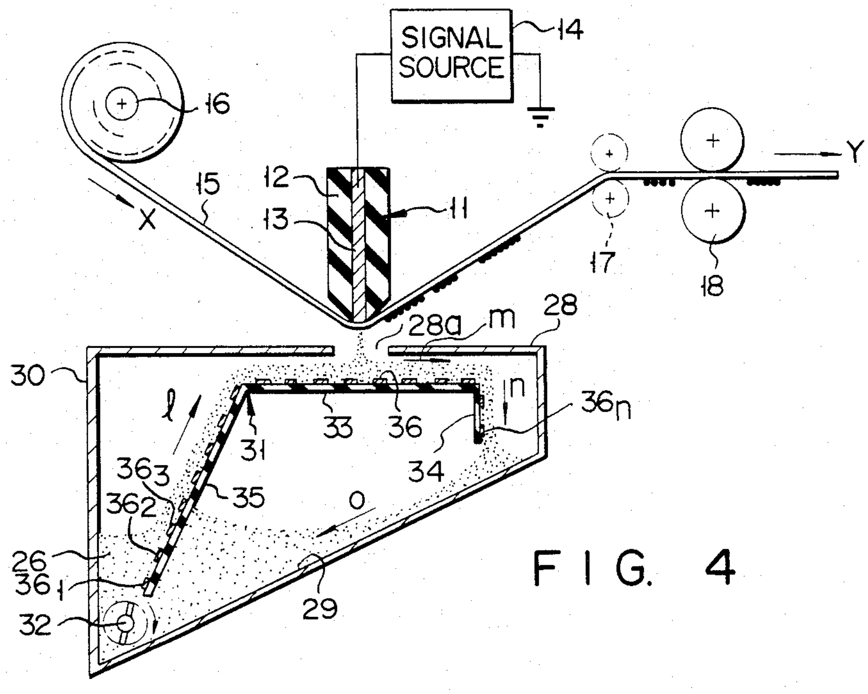
FIG. 4

RECORDING APPARATUS USING A TONER-FOG GENERATED BY ELECTRIC FIELDS APPLIED TO ELECTRODES ON THE SURFACE OF THE DEVELOPER CARRIER

BACKGROUND OF THE INVENTION

The invention relates to a recording apparatus for obtaining a visible image on a recording medium according to image information and, more particularly, to a recording apparatus in which a signal voltage, according to image information, is applied to one side of a recording medium, while a visible image is obtained by development done on the other side of the recording medium.

A development process using powder or liquid developer on one side of a recording medium while applying a signal voltage to the other side of the recording medium has been known as contrography. In this case, a recording electrode is held in contact with one side of the recording medium, while development by using powder or liquid developer is done on the other side of the recording medium simultaneous with the application of a signal voltage to the recording electrode. The simultaneous signal voltage application and development simplified the recording process. In addition, since the visible image is formed on the side of the recording medium opposite the side in contact with the recording electrode, the process is suited to color recording, in which development is repeatedly done on the same recording medium.

FIG. 1 shows a prior art recording apparatus based on contrography using a powder developer. The apparatus uses a developer carrying member 1, on the surface of which a layer of a powder developer 2 is formed by magnetic forces or the like. A recording medium 3 and a recording electrode 4 are disposed in the vicinity of the developer layer to effect development. This apparatus, however, has the following deficiencies.

The powder developer 2 is a self-agglomerated due to Coulomb forces based on mutual triboelectrification of developer particles, Van der Waals force, etc. Also, powder developer experiences image forces tending to retain it on the surface of the developer carrying member 1. Where a magnetic toner is used as the powder developer 2 and is held on the surface of the developer carrying member 1 by magnetic forces, retaining force due to the magnetic forces is further exerted to the developer 2. The retaining force described above must be overcome by applying a sufficiently high voltage to the recording electrode 4 from a recording signal source 5 in order to effect transfer of the developer 2 from the surface of the developer carrying member 1 to the surface of the recording medium 3. This presents problems in construction and also increases the cost. Further, because an electric field of high intensity must be provided in the gap between the recording medium 3 and developer carrying member 1, the width of the gap must be set to a very small value. This demands high mechanical precision. In order to obtain a developer image with low recording voltage, it has been proposed to effect development with a recording medium 3 in contact with the development layer. According to this method, however, it is difficult to remove developer 2 attached to non-image areas, i.e., fogging. Besides, a highly insulating special sheet must be used as the recording medium 3 to avoid dielectric breakdown thereof due to discharge between the recording electrode 4 and developer carrying member 1.

A recording apparatus using a liquid developer has similar problems to those discussed above. More specifically, toner particles in the liquid developer have low mobility and thus require high voltage to obtain a high-density visible image. In addition, in order to prevent increased fogging as a result of permeation of the liquid developer into the recording medium, at least one side of the recording medium must be given a liquid developer permeation prevention treatment.

SUMMARY OF THE INVENTION

The invention has been designed in light of the details discussed above, and its object is to provide a recording apparatus which permits a high quality visible image to be obtained with a low recording voltage, even with a large gap set between the recording electrode and the surface of the developer carrying member, while requiring no substantially high mechanical precision and permitting use of a non-treated or substantially non-treated ordinary sheet as the recording medium.

According to one aspect of the present invention, there is provided a recording apparatus in which a visible image based on image information is formed on a recording medium by a developer, and which comprises developer carrying means spaced apart at a predetermined distance from and facing the recording medium and carrying the developer thereon; developer propelling means for propelling the developer on the developer carrying means to the recording medium by generating an electric field between the recording medium and developer carrying means according to the image information; and developer smoke-forming means for rendering the developer, carried on at least a portion of the developer carrying means facing the developer propelling means, into the form of smoke in an area just above the developer carrying means.

BRIEF DESCRIPTION OF THE DRAWINGS

FIG. 3 is a schematic sectional view for explaining the operational principles of the first embodiment;

FIG. 4 is a schematic sectional view showing a second embodiment of the recording apparatus according to the invention;

DETAILED DESCRIPTION OF THE PREFERRED EMBODIMENTS

Now, a first embodiment of the recording apparatus according to the invention will be described with reference to FIGS. 2 and 3 of the accompanying drawings.

Figure 1:
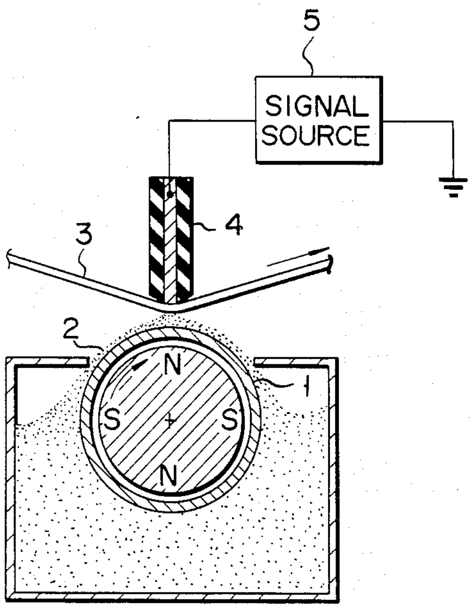
FIG. 1 (PRIOR ART)
FIG. 1 is a schematic sectional view showing a prior art recording apparatus based on the contragraphy system.
Figure 2:
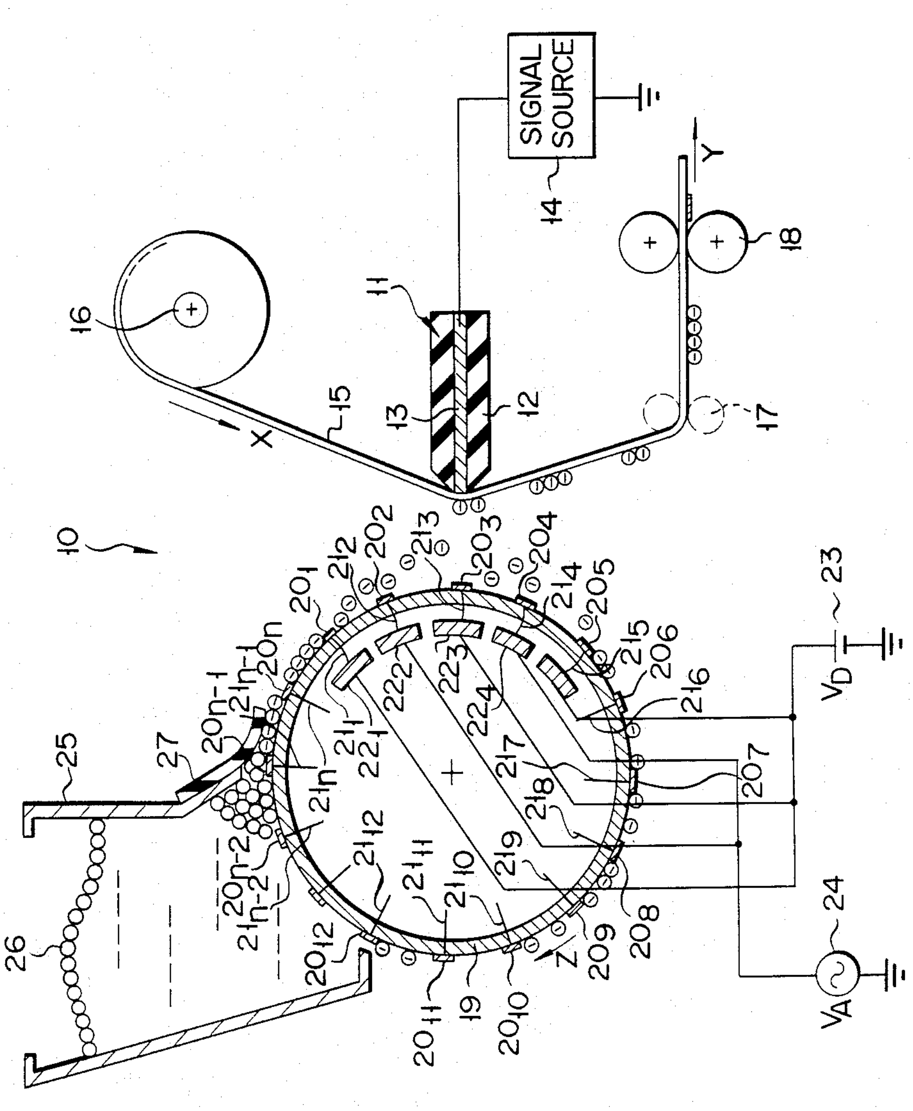
FIG. 2 is a schematic sectional view showing a first embodiment of the recording apparatus according to the invention.

Referring to FIG. 2, reference numeral 10 designates the recording apparatus having a housing (not shown), in which a recording electrode 11 is disposed such that it extends in the width direction of a recording medium, i.e., an ordinary sheet 15, perpendicular to the feed direction thereof as indicated by arrow X. The recording electrode 11 consists of an insulator 12 and a number of stylus electrodes 13 buried in the insulator 12 in a row extending in the width direction noted above. Each of the stylus electrodes 13 is connected to a signal source 14. A time sequence signal voltage, corresponding to the image information to be recorded, is provided from the signal source 14 and applied to the stylus electrodes 13. The ordinary sheet 15 is taken up from a sheet roll 16 and transported by pairs of transport rollers 17 and 18 past the distal end of the recording electrode 11 in the direction of arrow Y.

A cylindrical developing roller 19 as a developer carrying member is disposed at a distance of, for instance, 2 mm from the distal end of the recording electrode 11. The developing roller 19 is rotated in the clockwise direction as indicated by arrow Z by a driving mechanism (not shown). The developing roller 19 consists of a hollow aluminum cylinder with an outer diameter of 40 mm and a thin polyimide resin film coated on the outer periphery and opposite ends of the hollow aluminum cylinder. The outer periphery of the resin film is provided with a plurality of circumferentially spaced, axially-extending, parallel copper-wire electrodes $\mathbf{20}_1$ to $\mathbf{20}_n$ which are electrically insulated from one another. The linear copper electrodes $\mathbf{20}_1$ to $\mathbf{20}_n$ are formed by depositing a thin copper film by a vacuum deposition process on the peripheral thin polyimide film of the developing roller 19, and selectively etching the deposited thin copper film. The linear copper electrodes $\mathbf{20}_1$ to $\mathbf{20}_n$ each have a width of 0.5 mm and a thickness of 5 $\mu$, and they are spaced apart at intervals of 0.2 mm. Leads $\mathbf{21}_1$ to $\mathbf{21}_n$ are connected at one end to one end of the respective linear electrodes $\mathbf{20}_1$ to $\mathbf{20}_n$. The leads $\mathbf{21}_1$ to $\mathbf{21}_n$ penetrate the developing roller 19 and extend toward the center thereof. A brush (not shown) is provided on the other end of these leads $\mathbf{21}_1$ to $\mathbf{21}_n$.

Inside the developing roller 19, five power supply electrodes $\mathbf{22}_1$ to $\mathbf{22}_5$ are provided. The electrodes $\mathbf{22}_1$ to $\mathbf{22}_5$ extend axially in an arcuate sectional arrangement along and at a fixed distance from the inner periphery of the developing roller 19. The electrodes $\mathbf{22}_1$ to $\mathbf{22}_5$ are secured to a stationary member (not shown), that is, are held at a fixed position relative to and facing the recording electrode 11, irrespective of the rotation of the developing roller 19. The leads $\mathbf{21}_1$ to $\mathbf{21}_n$ are successively brought into contact with the power supply electrodes $\mathbf{22}_1$ to $\mathbf{22}_5$ with the rotation of the developing roller 19. Of the power supply electrodes $\mathbf{22}_1$ to $\mathbf{22}_5$, every other one $\mathbf{22}_1$, $\mathbf{22}_3$ and $\mathbf{22}_5$ is connected to a DC voltage source 23, and the remaining ones $\mathbf{22}_2$ and $\mathbf{22}_4$ are connected to an AC voltage source 24. When the leads $\mathbf{21}_1$ to $\mathbf{21}_n$ comes to the region where the power supply electrodes $\mathbf{22}_1$ to $\mathbf{22}_5$ are found, they successively touch the power supply electrodes $\mathbf{22}_1$ to $\mathbf{22}_5$. Thus, a DC, AC, DC, AC and DC voltage are successively applied in the mentioned order between adjacent ones of the linear electrodes $\mathbf{20}_1$ to $\mathbf{20}_n$ as these linear electrodes proceed past the recording electrode 11.

A hopper 25 is provided for co-operation with an upper portion of the developing roller 19. An insulating toner 26 is accommodated as the developer in the hopper 25, and is supplied therefrom to the developing roller 19. The toner 26 includes negatively chargeable particles, which are composed of a resin e.g., styrene resins, acrile resins, epoxy resins, polyester resins and malein resins and their copolymers, a pigment such as a carbon black and a charging control agent such as die, these components being incorporated in desired proportions. An elastic blade 27 is provided on a rear portion of the hopper 25 in the rotation direction of the developing roller 19 as indicated by arrow Z. The blades 27 serves to forcibly charge the toner 26 to the negative polarity, for instance, and also regulate the thickness of the toner layer on the developing roller 19.

When the developing roller 19 is rotated in the clockwise direction of arrow Z, the toner 26 in the hopper 25 is forced out between the developing roller 19 and elastic balde 27 and negatively charged by friction. With the rotation of the developing roller 19, an AC voltage $V_A$ (of 200 $V_{P-P}$, 1 kHz, for instance) from the AC voltage source 24 and a DC voltage $V_D$ (of 0 V, for instance) from the DC voltage source 23, are alternately applied to the linear electrodes $\mathbf{20}_1$ to $\mathbf{20}_n$ via the leads $\mathbf{21}_1$ to $\mathbf{21}_n$. For example, the AC voltage $V_A$ is applied to the linear electrodes $\mathbf{20}_2$ and $\mathbf{20}_4$ via the leads $\mathbf{21}_2$ and $\mathbf{21}_4$ respectively, while the DC voltage $V_D$ is applied to the linear electrodes $\mathbf{20}_1$, $\mathbf{20}_3$ and $\mathbf{20}_5$ via the leads $\mathbf{21}_1$, $\mathbf{21}_3$ and $\mathbf{21}_5$, respectively. At this time, an alternating electric field is generated between adjacent ones of the linear electrodes $\mathbf{20}_1$ to $\mathbf{20}_5$. The particles of the toner 26 in the alternating electric field are oscillated so that they are partially liberated from one another and also from the surface of the developing roller 19 to remain in the form of toner smoke in the vicinity of the surface of the developing roller 19.

The principle under which the toner 26 is liberated and rendered into the form of smoke will now be described in detail with reference to FIG. 3. Assume now that the AC voltage $V_A$ is applied from the AC voltage source 24 to the electrodes $\mathbf{20}_3$ and $\mathbf{20}_5$, while the DC voltage $V_D$ from the DC voltage source 23 is applied to the electrodes $\mathbf{20}_2$, $\mathbf{20}_4$ and $\mathbf{20}_6$. At this moment, an alternating electric field is generated between, for instance, the electrode $\mathbf{20}_3$ to which the AC voltage $V_A$ is applied, and the adjacent electrode $\mathbf{20}_2$ to which the DC voltage $V_D$ is applied. In this electric field, particles of the toner 26, having been negatively charged, for instance, by friction with the surface of the developing roller 19 and carried thereon, experience a force tending to move then from the electrode $\mathbf{20}_2$ to the electrode $\mathbf{20}_3$ as soon as a condition $V_A > V_D$ is established, and also experience a force tending to move them from the elecrode $\mathbf{20}_3$ to the electrode $\mathbf{20}_2$ as soon as a condition $V_A < V_D$ is established. Thus, the toner 26 remains in the form of smoke in a space in the vicinity of the surface of the developing roller 19 between the electrodes $\mathbf{20}_2$ and $\mathbf{20}_3$ while undergoing oscillatory motion along the electric lines of force between the two electrodes.

With a positive signal voltage (of 100 V, for instance) applied to the recording electrode 11 with the recording medium 15 being fed therepast, the liberated toner 26 retained in a space facing the recording electrode 11 is readily caused to fly (propelled to the ordinary sheet 15 and be attached thereto by the force acting on it in the direction toward the ordinary sheet 15, the force being generated by the electric field set up between the recording electrode 11 and developing roller 19. With the rotation of the developing roller 19, the leads get out of contact with the power supply electrodes $22_1$ to $22_5$. Particles of the toner 26 that have not contributed to the formation of a visible image are then attached again to the surface of the developing roller 19 to be returned to the hopper 25.

With the first embodiment described above, the following effects can be obtained.

(1) In the formation of a visible image, particles of the toner 26 are preliminarily liberated into the form of smoke in a space between the developing roller 19 and ordinary sheet 15 as they are oscillated between adjacent ones of the electrodes $20_1$ to $20_n$, provided on the outer periphery of the developing roller 19. In this state of toner, the self-agglomerating force of the toner particles and the restraining force attracting the toner to the surface of the developing roller 19, are substantially zero or very low, if anything. The toner 26 can thus be moved toward the ordinary sheet 15 to obtain formation of a satisfactory visible image even if the signal voltage applied to the recording electrode 11 is low.

(2) For the same reasons as described above in (1), a high quality visible image can be obtained with a low recording voltage even in the case where the gap between the recording electrode 11 and the surface of the developing roller 19 is set to a high value. Since high mechanical precision is thus unnecessary, apparatus design and assembly techniques for high precision setting of the gap are not needed, thus permitting the reduction of the apparatus cost and simplification of the maintenance service.

(3) Since the signal voltage level can be reduced and also the gap between the recording electrode 11 and surface of developing roller 19 can be increased, the dielectric breakdown of the gap can be avoided. Thus, a non-treated or substantially non-treated ordinary sheet 15 can be used as the recording medium.

(4) Since the particles of the toner 26 in the form of smoke are free from the mutual self-agglomerating force, they can be attached as primary particles to the ordinary sheet 15, so that dense and high quality visible images can be obtained.

The construction of the first embodiment of the invention described above has been given for the sake of illustration only, and it can be modified variously without departing from the scope and spirit of the invention. Other embodiments of the invention will now be described. In the following description, the same or corresponding parts to those in the preceding first embodiment are shown using the same reference numerals, while omitting their description.

Figure 5:
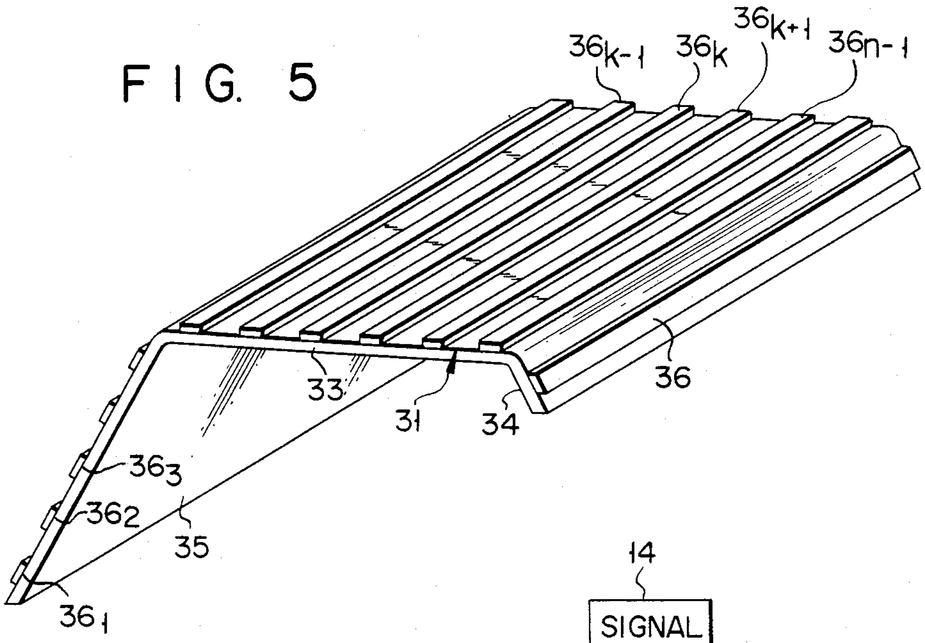
FIG. 5 is a perspective view showing a carrying member used in the second embodiment.

In the preceding first embodiment, the developing roller 19 as the developer carrying member was rotated, and the toner 26 was supplied thereto from the hopper 25. However, this is by no means limitative, and the developer carrying member may be stationary as in a second embodiment, which will now be described with reference to FIGS. 4 through 6.

Referring to FIG. 4, below the recording electrode 11 is disposed a toner reservior 30, which has a top 28 provided with an opening 28*a* facing the recording electrode 11 and an inclined bottom 29 and accommodates the toner 26. In the toner reservior 30 are disposed a toner carrying plate 31 as the developer carrying member, secured in a position such that it faces the end of the recording electrode 11 at a predetermined distance therefrom, and a toner agitator 32 for agitating the toner 26. The toner carrying plate 31 is made of an insulator. As is most clearly shown in FIG. 5, the toner carrying plate 31 has a horizontal portion 33, a vertical portion 34 descending from the right end of the horizontal portion 33 and an inclined portion 35 downwardly inclining from the left end of the horizontal portion 33. The lower end of the inclined portion 35 is found near the lower end of the inclined bottom 29 of the toner reservior 30 and immersed in the toner 26 therein. The lower end of the vertical portion 34 is found near the upper end of the inclined portion 29 and above the toner 26 in the reservior 30.

Figure 6:
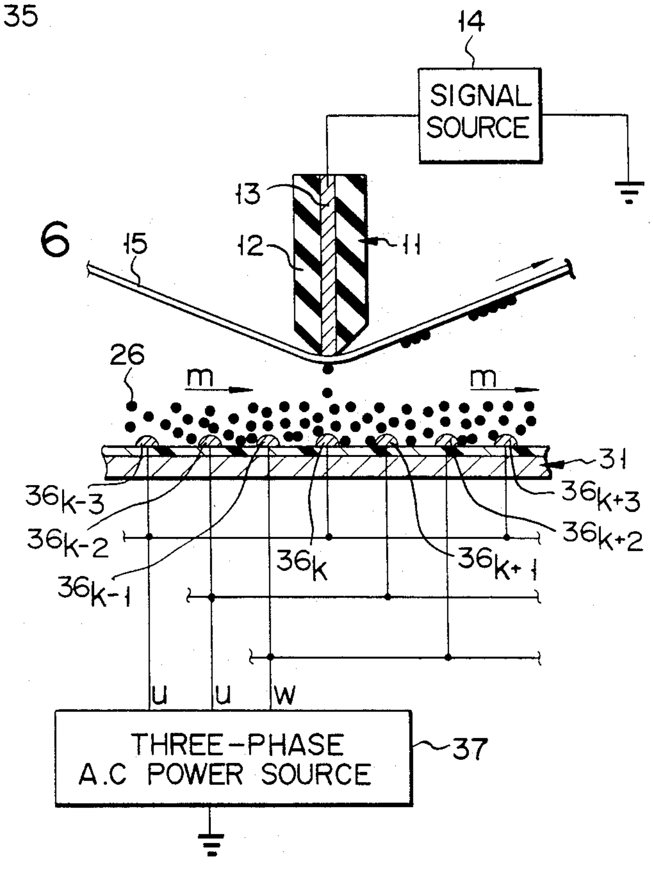
FIG. 6 is a schematic sectional view for explaining the operational principles of the second embodiment.

The surface of the toner carrying plate 31 is provided with a plurality of uniformly spaced parallel linear electrodes $36_1$ to $36_n$ extending in the width direction of the toner carrying plate 31. At least three AC voltages of different phases are applied to the electrodes $36_1$ to $36_n$, as schematically shown in FIG. 6. In the illustrated example, a three-phase AC voltage source 37 provides three-phase AC voltages u, v and w, 120 degrees out of phase from one another. Its terminal u is connected to the linear electrodes . . . , $36_{k-3}$, $36_k$, $36_{k+3}$, . . . , its terminal v is connected to the linear electrodes . . . , $36_{k-2}$, $36_{k+1}$, $36_{k+4}$ . . . , and its terminal w is connected to the linear electrodes . . . , $36_{k-1}$, $36_{k+2}$, $36_{k+5}$, . . . . When the three-phase AC voltages are applied, a propagating alternating electric field is generated, which propagates along the surface of the toner carrying plate 31 from the inclined portion 35 to the horizontal portion 33.

The toner 26, which is always present on the surface of lower end of the inclined portion 35 of the toner carrying plate 31, is negatively charged by friction with the surface of the toner carrying plate 31 and by the agitator 32. When the propagating alternating electric field is generated by the three-phase AC voltages applied to the electrodes $36_1$ to $36_n$, the toner 26 is transported up the inclined portion 35 of the toner carrying plate 31, as shown by arrow l, while it is oscillated and liberated to be rendered into the form of smoke between adjacent linear electrodes. Eventually, it reaches the horizontal portion 33 and proceeds therealong as shown by arrow m. When it reaches a development zone facing the recording electrode 11, it is supplied through the opening 28 to the ordinary sheet 15 as recording medium, whereby a visible image is formed. The toner 26, which has not contributed to the formation of the visible image, is carried along in the direction of arrow m to fall along the vertical portion 24, as shown by arrow n, and then slide down the bottom 29 of the toner reservior 30, as shown by arrow o, by the graviational force to return to a zone, in which the lower end of the inclined portion 35 of the toner carrying plate 31 is found.

With the second embodiment as described above, in addition to the effects obtainable with the previous first embodiment, the toner carrying plate 31 is stationary and does not require any drive means as in the first embodiment while providing a toner transport function.

Thus, it is possible to simplify the construction and reduce the size of the apparatus.

Figure 7:
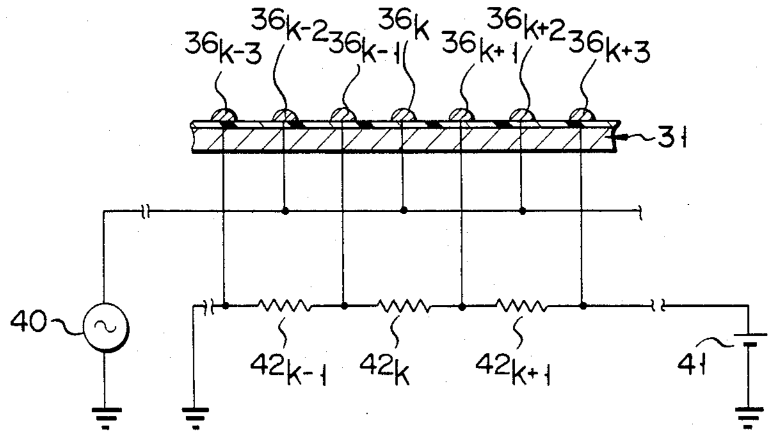
FIG. 7 is a schematic sectional view showing a modification of the second embodiment.
Figure 9:
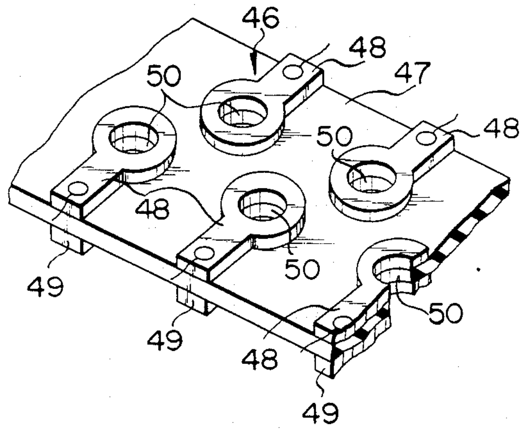
FIG. 9 is a fragmentary perspective view of a control electrode shown in FIG. 8.

In the above second embodiment, the three-phase AC voltage source 37 has been used as means for voltage application to the linear electrodes $36_1$ to $36_n$, with its output terminals u, v and w connected to the linear electrodes $36_1$ to $36_n$, as shown in FIG. 6, to generate the propagating alternating electric field. This arrangement, however, may be suitably modified. FIG. 7 shows a modification of the second embodiment. In this instance, an AC voltage (e.g., 200 $V_{P-P}$) is applied to all other linear electrodes $36_{k-2}$, $36_k$, $36_{k+2}$, . . . among the electrodes $36_1$ to $36_n$. The other linear electrodes $36_{k-3}$, $36_{k-1}$, $36_{k+1}$, $36_{k+3}$, . . . are connected to respective voltage division points of a voltage divider, consisting of a plurality of series resistors $42_l$ to $42_m$ connected between a DC voltage source 41 and ground. These linear electrodes, which are not connected to the AC voltage source 40, are applied to DC voltages of progressively increasing levels in one direction from the DC voltage source. With this arrangement, the negatively charged toner, present on the surface of the toner carrying plate, is transported in one direction (i.e., from the left to the right in this instance) by the progressively increasing DC electric field, while it is oscillated and liberated to be rendered into smoke by the alternating electric field superimposed on the DC electric field between adjacent linear electrodes. With this modification, the same effects as described in the preceding second embodiment can be obtained.

The first and second embodiments described above refer to a recording apparatus of the type in which an image signal is applied to recording electrodes. The recording electrodes are spaced a predetermined distance from and facing a developer carrying member on one side of a recording medium, while a visible image corresponding to the image signal is formed on the other side of the recording medium. The visible image is formed by causing a developer, carried on the developer carrying member, to be attached to the recording medium by an electric field generated between the recording electrode and developer carrying member. In these two embodiments a plurality of electrodes is provided on the developer carrying member, while electric field generating means, for generating an alternating electric field between adjacent ones of these plurality of electrodes, is provided to render the developer carried on the developer carrying member into the form of smoke by the electric field, formed by the electric field generating means. Thus, a high quality visible image can be obtained with a low recording voltage even in a case where the gap between the recording electrode and developer carrying member surface is set to a large value. High mechanical precision is thus not needed. Also, it is possible to use a non-treated or substantially non-treated ordinary sheet as the recording medium.

Figure 8:
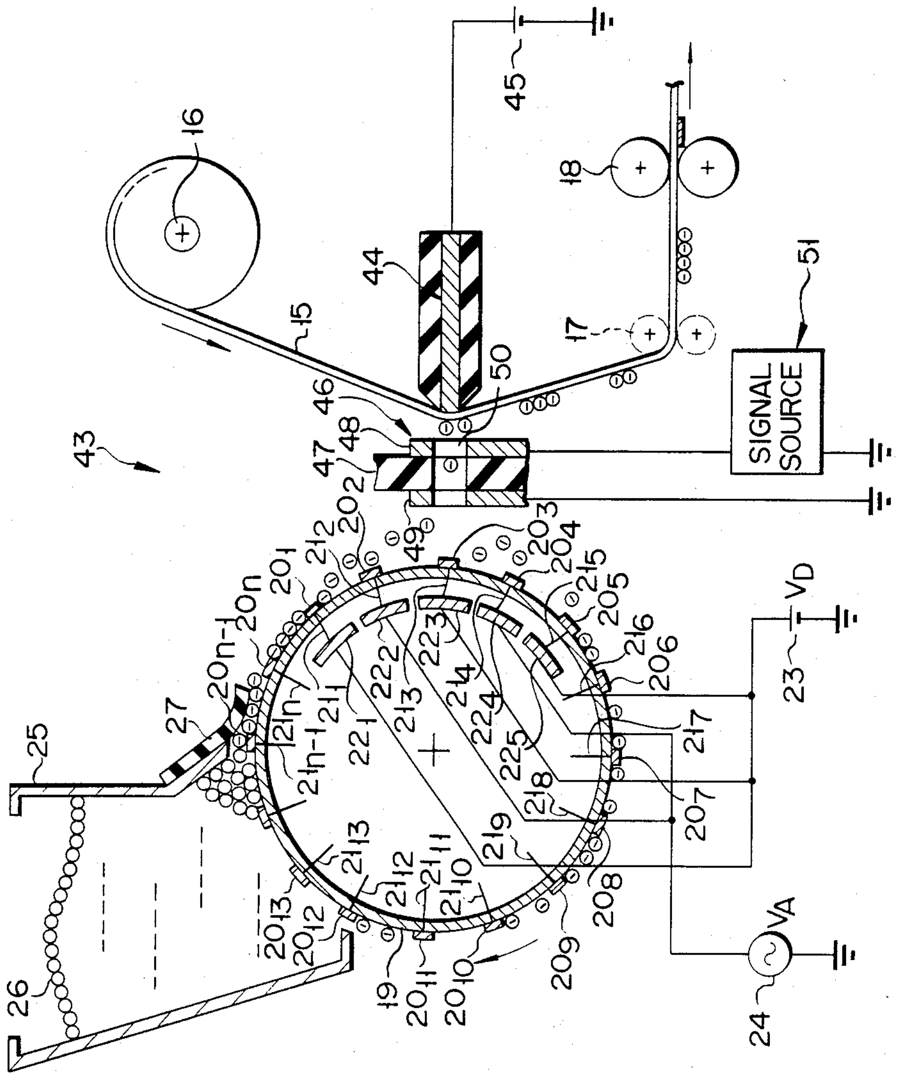
FIG. 8 is a schematic sectional view showing a third embodiment of the recording apparatus according to the invention.
Figure 10:
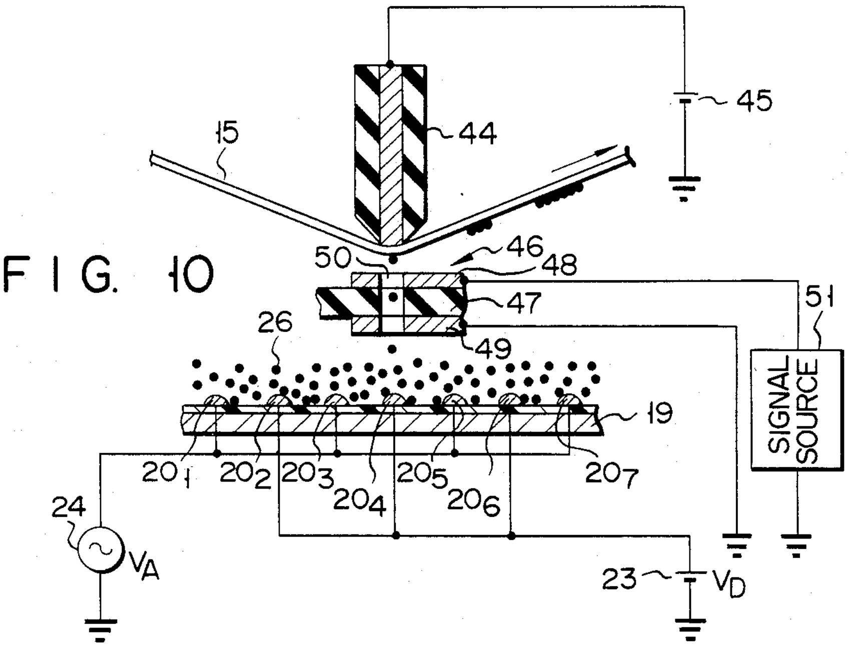
FIG. 10 is a schematic sectional view for explaining the operational principles of the third embodiment.

In the previous first and second embodiments, the recording electrode was provided such that it is in contact with one side of the recording medium to form a visible image by application of a signal voltage. However, this arrangement is not limitative, and a visible image can be formed without the use of any recording electrode, as in a third embodiment which will now be described with reference to FIGS. 8 through 12. As shown in FIG. 8, the recording apparatus 43 of the third embodiment does not have any recording electrode 11 as in the preceding embodiments. Instead, a back electrode 44 is provided at the position of the recording electrode 11. A positive DC voltage is applied to the back electrode 44 from a DC voltage source 45.

Between the back electrode 44 and the developing roller 19 as the developer carrying member, a control electrode 46 is provided for controlling the supply of toner 26. The control electrode 46 is spaced by 1 mm, for instance, from the distal end of the back electrode 44. As shown in detail in FIG. 9, the control electrode 46 includes an insulating layer 47 and a number of pairs of electrodes 48 and 49 provided on the opposite sides of the insulating layer 47. A toner passage hole 50 is formed through each pair of electrodes 48 and 49 and insulating layer 47 therebetween. A signal voltage is applied from a signal source 51 to the electrode 48, which opposes the back electrode 44, while the other electrode 49 opposing the developing roller 19 is grounded. The insulating layer 47 has a thickness of 300μ. The electrodes 48 and 49 have a thickness of 20μ. The toner passage holes 50 have a diameter of 150μ. The toner passage holes are formed in a row at a pitch of 300μ using a laser beam. The insulating layer 47 is made of polyester, and the electrodes 48 and 49 are made of copper.

With the third embodiment as described, the toner 26 is rendered into smoke under the same principles as discussed before in connection with the first embodiment, refer to FIG. 3.

A fixed positive voltage is applied from the DC voltage source 45 to the back electrode 44. When a positive signal voltage (of 100 V, for instance) is applied to the electrodes 48 of the control electrode 46 in this state, the toner 26, in the form of smoke and in the neighborhood of the toner passage holes 50 of the control electrode 46, is attracted by the back electrode 44 through the toner passage holes 50 to the surface of the ordinary sheet 15, whereby a visible image is formed thereon.

Figure 11:
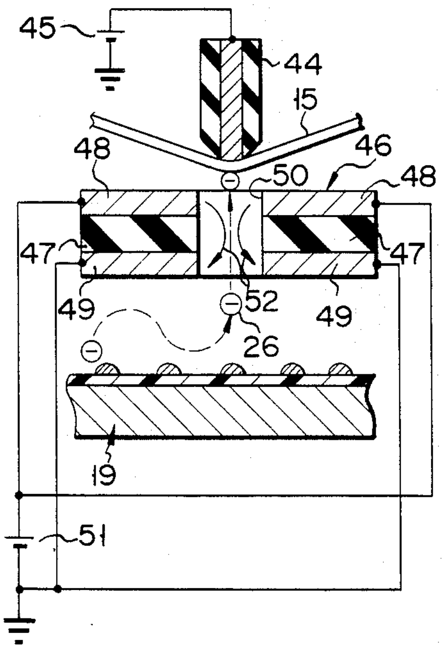
FIGS. 11 and 12 are schematic sectional views showing the control electrode in different operating states.
Figure 12:
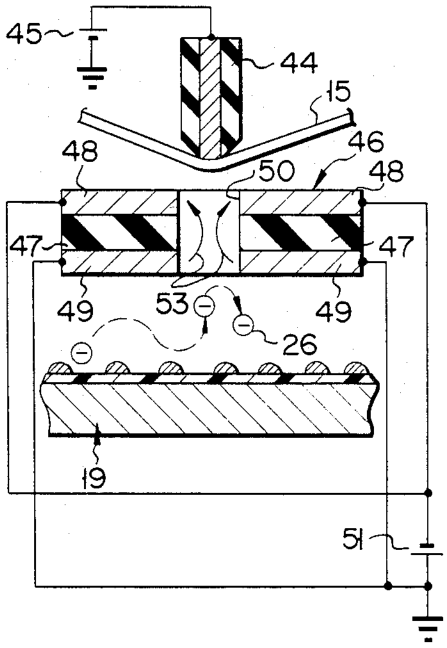

The principles of the toner supply control through the toner passage holes 50 will now be described. Assume that a positive voltage is applied from the signal source 51 to the electrode 48 while the mate electrode 49 is grounded, as shown in FIG. 11. In this case, electric lines 52 of force directed from the upper electrode 48 to the lower electrode 49 are generated in the toner passage hole 50. Meanwhile, there also exist electric lines of force (not shown) directed from the back electrode 44 to the developing roller 19. The toner 26 in the neighborhood of the toner passage hole 50 of the control electrode 46 thus experiences upward forces due to both of the electric lines of force noted above, so that it flies through the toner passage hole 50 to reach and be attached to the ordinary sheet 15. Now assume that a negative voltage is applied from the signal source 51 to the electrode 48 (FIG. 12). In this case, electric lines 53 of force directed from the lower electrode 49 to the upper electrode 48 are generated in the toner passage hole 50. In this case, the negatively charged toner 26 cannot pass through the toner passage hole 50 or reach the ordinary sheet 15 due to the electric lines 53 of force. In this way, the supply of toner 26 through the toner passage holes 50 is controlled by the signal voltage applied to the control electrode 46, that is, the toner 26 is attached to the surface of the ordinary sheet 15 to form a visible image according to the image signal.

The toner 26 that has not contributed to the formation of the visible image passes with the developing roller 19 through the zone where there are alternative electric fields to be eventually attached to the surface of the developing roller 19 and returned to the hopper 25.

With the above third embodiment, the following effects can be obtained.

(1) In the formation of a visible image, the toner 26 is preliminarily liberated into smoke in a space between the developing roller 19 and ordinary sheet 15 as it is oscillated between adjacent ones of the electrodes $20_1$ to $20_n$ on the outer periphery of the developing roller 19. Thus, the toner 26 is experiencing substantially zero or very low, if any, self-agglomerating force and retaining force attracting it to the surface of the developing roller 19. Under this condition, it can be moved toward the ordinary sheet 15 so that a satisfactory visible image can be formed even if the signal voltage applied to the recording electrode 11 is low. In addition, the electric field generated in the toner passage holes 50 can be increased in intensity by reducing the thickness of the insulating layer 43 of the control electrode 46. Doing so permits setting the voltage applied to the control electrode 46 to a very low level, compared to the voltage applied to the recording electrode in the prior art method.

(2) For the same reason as described above in (1), a high quality visible image can be obtained with a low recording voltage even in a case where the gap between the ordinary sheet 15 and developing roller 19 is increased. Since high mechanical precision is thus unnecessary, apparatus design and assembly techniques for high precision setting of the gap are not needed, thus permitting the reduction of the apparatus cost and simplification of the maintenance service.

(3) Since the signal voltage level can be reduced and the gap noted can also be increased, the dielectric breakdown among the developing roller 19, control electrode 46 and back electrode 44 can be prevented. It is thus possible to use a non-treated or substantially non-treated ordinary sheet 15.

(4) Since the toner 26 in the form of smoke is free from the self-agglomerating force, it can be attached as primary particles to the ordinary sheet 15, so that dense and high quality visible images can be obtained.

(5) For the same reason as in (1), the toner passage holes 50 will never be clogged by agglomerated toner.

In the third embodiment, the rotary developing roller 19 was used as the developer carrying member as in the first embodiment. However, it is possible to use the carrying plate as the developer carrying member as in the second embodiment while using the control electrode 46 in the third embodiment.

Figure 13:
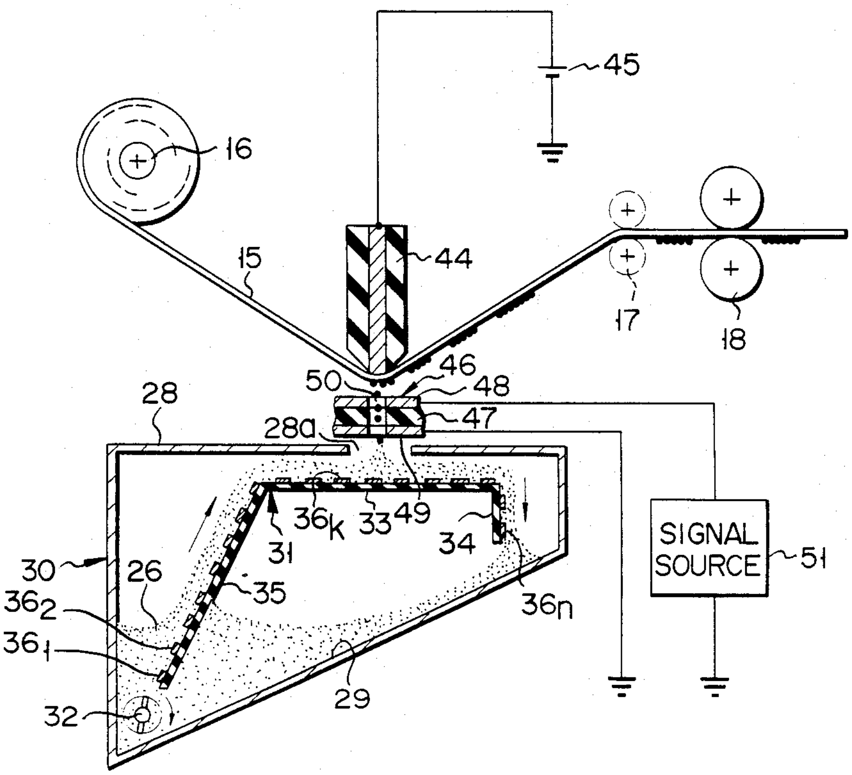
FIG. 13 is a schematic sectional view showing a fourth embodiment of the recording apparatus according to the invention.
Figure 14:
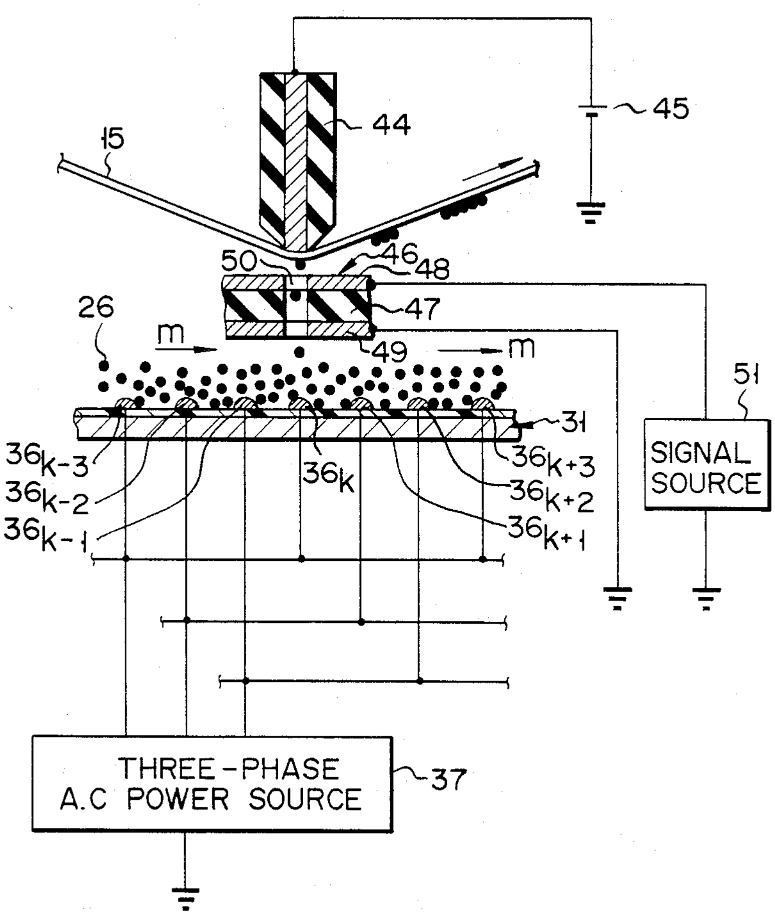
FIG. 14 is a schematic sectional view for explaining the operational principles of the fourth embodiment.

Such an arrangement is shown as a fourth embodiment in FIGS. 13 and 14. In this instance, toner reservoir 30 as described above is disposed below the back electrode 44, and the control electrode 46 as described above is disposed between opening 28*a* of the toner reservoir 30 and back electrode 44. With this embodiment, the effects of the previous second and third embodiments can be obtained in combination.

Further, the arrangement of FIG. 7 may be incorporated into the fourth embodiment to obtain the same effects.

With the third and fourth embodiments described above, which comprise a developer carrying member facing a recording medium and provided with a plurality of electrodes, an alternating electric field generating means between adjacent ones of the plurality of electrodes and a control electrode for controlling the propelling of developer from the developer carrying member to the recording medium, a high quality visible image can be obtained with a low recording voltage even in a case where the gap between the recording medium and developer carrying member's surface is set to a high value. Thus, high mechanical precision is not needed, and a non-treated, or substantially non-treated, ordinary sheet can be used as the recording medium.

What is claimed is:

1. A recording apparatus in which a visible image, based on image information, is formed on a recording medium by a developer, comprising:

developer carrying means spaced at a predetermined distance from and facing said recording medium, for carrying said developer thereon;

developer propelling means for propelling said developer from said developer carrying means to said recording medium by generating an electric field between said recording medium and said developer carrying means according to said image information; and developer smoke-forming means, connected only to said developer carrying means, for rendering the developer, carried on at least a portion of said developer carrying means which faces said developer propelling means, into the form of smoke in the vicinity of said developer carrying means.

2. The recording apparatus according to claim 1, wherein said developer smoke forming means includes:

a plurality of mutually insulated electrodes provided on said developer carrying means and extending therefrom in one direction; and electric field generating means for generating an alternating electric field between adjacent ones of said electrodes to cause oscillations of said developer, found between said adjacent electrodes, along electric lines of force therebetween, to thereby liberate said developer from said developer carrying means.

3. The recording apparatus according to claim 2, wherein said developer carrying means includes an insulating cylinder rotating in one direction with said developer attached thereto, said electrodes being provided on said insulating cylinder in a circumferentially spaced arrangement and extending in the axial direction of said insulating cylinder, the developer on said insulating cylinder being rendered into the form of smoke on said insulating cylinder by said smoke forming means and brought to a position facing said developer propelling means with the rotation of said insulating cylinder.

4. The recording apparatus according to claim 3, wherein said developer propelling means includes:

a recording electrode disposed on a side of said recording medium opposite said developer carrying means; and a signal source, connected to said recording electrode, for providing a signal voltage corresponding to said image information, the developer preliminarily rendered into the form of smoke on said insulating cylinder being attracted to said recording medium to form a visible image according to said signal voltage from said signal source.

5. The recording apparatus according to claim 3, wherein said developer propelling means includes:

a back electrode disposed on a side of said recording medium opposite said developer carrying means;

a bias source, connected to said back electrode, for exerting a weak force on the developer in the form of smoke to attract said developer to said recording medium;

a control electrode disposed between said recording medium and developer carrying means; and a signal source, connected to said control electrode, for providing a signal voltage according to said image information, the developer preliminarily rendered into the form of smoke on said insulating cylinder being attracted to said recording medium to form a visible image according to said signal voltage from said signal source.

6. The recording apparatus according to claim 5, wherein said control electrode includes:

an insulating layer;

at least a pair of auxiliary electrodes formed on opposite sides of said insulating layer; and an observation hole formed in a lamination of said insulating layer and auxiliary electrodes, the signal voltage from said signal source being applied between said pair of auxiliary electrodes to control passage of said developer through said observation hole.

7. The recording apparatus according to claim 2, wherein said developer carrying means includes:

a stationary insulating developer carrier member extending in a direction of movement of said recording medium, the developer being attached to said developer carrying member;

said plurality of electrodes being provided on said developer carrying member in a spaced relation in the extending direction thereof and extending in a direction perpendicular to said extending direction;

said electric field generating means applying a plurality of AC voltages of different phases to said electrodes to generate an AC electric field of a propagating type on the surface of said developer carrying member; and the developer on said developer carrying member being rendered into the form of smoke on said developer carrying member by said smoke forming means and brought to a position facing said developer propelling means by the alternating electric field of a propagating type generated by said electric field generating means.

8. The recording apparatus according to claim 7, wherein said developer propelling means includes:

a recording electrode disposed on a side of said recording medium opposite said developer carrying member; and a signal source, connected to said recording electrode, for providing a signal voltage corresponding to said image information, the developer preliminarily rendered into the form of smoke on said developer carrying member being attracted to said recording medium to form a visible image according to said signal voltage from said signal source.

9. The recording apparatus according to claim 7, wherein said developer propelling means includes:

a back electrode disposed on a side of said recording medium opposite said developer carrying member;

a bias source, connected to said back electrode, for exerting a weak force on the developer in the form of smoke to attract said developer to said recording medium;

a control electrode disposed between said recording medium and said developer carrying means; and a signal source, connected to said control electrode, for providing a signal voltage according to said image information, the developer preliminarily rendered into the form of smoke on said developer carrying member being attracted to said recording medium to form a visible image according to the signal voltage from said signal source.

10. The recording apparatus according to claim 9, wherein said control electrode includes:

an insulating layer;

at least a pair of auxiliary electrodes formed on opposite sides of said insulating layer; and an observation hole formed in a lamination of said insulating layer and auxiliary electrodes, the signal voltage from said signal source being applied between said pair of auxiliary electrodes to control passage of said developer through said observation hole.

* * * * *